(12) United States Patent
Patel et al.

(10) Patent No.: US 12,374,083 B2
(45) Date of Patent: Jul. 29, 2025

(54) ON-THE-FLY CALIBRATION OF AN IMAGE CLASSIFIER

(71) Applicant: Robert Bosch GmbH, Stuttgart (DE)

(72) Inventors: Kanil Patel, Stuttgart (DE); Liangyu Zhong, Berlin (DE)

(73) Assignee: ROBERT BOSCH GMBH, Stuttgart (DE)

( * ) Notice: Subject to any disclaimer, the term of this patent is extended or adjusted under 35 U.S.C. 154(b) by 331 days.

(21) Appl. No.: 17/885,046

(22) Filed: Aug. 10, 2022

(65) Prior Publication Data
US 2023/0068516 A1    Mar. 2, 2023

(30) Foreign Application Priority Data

Aug. 30, 2021 (EP) ..................................... 21193766

(51) Int. Cl.
*G06V 10/764* (2022.01)
*G06V 10/75* (2022.01)
*G06V 10/771* (2022.01)

(52) U.S. Cl.
CPC .......... *G06V 10/764* (2022.01); *G06V 10/751* (2022.01); *G06V 10/771* (2022.01)

(58) Field of Classification Search
CPC .. G06V 10/764; G06V 10/751; G06V 10/771; G06N 3/0464; G06N 3/09; G06N 3/084
See application file for complete search history.

(56) References Cited

PUBLICATIONS

Ma, X. and Blaschko, M.B., Jul. 2021, Meta-cal: Well-controlled post-hoc calibration by ranking. In International Conference on Machine Learning (pp. 7235-7245). PMLR. (Year: 2021).*
Gawlikowski J, Saha S, Kruspe A, Zhu XX. Out-of-distribution detection in satellite image classification. arXiv preprint arXiv:2104.05442. Apr. 9, 2021. (Year: 2021).*
Techapanurak E, Okatani T. Practical evaluation of out-of-distribution detection methods for image classification. arXiv preprint arXiv:2101.02447. Jan. 7, 2021. (Year: 2021).*
Szegedy et al., "Rethinking the Inception Architecture for Computer Vision", Cornell University, 2015, pp. 1-15. <https://arxiv.org/pdf/1512.00567.pdf> Downloaded Aug. 9, 2022.
Kingma et al., "Adam: a Method for Stochastic Optimization," Cornell University, 2017, pp. 1-15.
Zhang et al., "Delving Deep Into Label Smoothing," IEEE Transactions on Image Processing, vol. 30, 2021 pp. 5984-5996.
Reed et al., "Training Deep Neural Networks on Noisy Labels With Bootstrapping," Cornell University, 2015, pp. 1-11.

* cited by examiner

*Primary Examiner* — Wassim Mahrouka
(74) *Attorney, Agent, or Firm* — NORTON ROSE FULBRIGHT US LLP

(57) ABSTRACT

A method of training an image classifier. The image classifier determines a prediction vector of class probabilities for an input image. First, one or more initial training steps are performed, resulting in current values for the trainable parameters of the image classifier. A training image and corresponding class label are selected, and a current label vector is determined for training the image classifier on the training image. To this end, the image classifier is applied to the training image according to the current parameter values. If the class predicted by the image classifier is equal to the class label, the current label vector is determined as a soft label based on the prediction vector. A current training step of training the image classifier on the training image is performed using the current label vector.

16 Claims, 7 Drawing Sheets

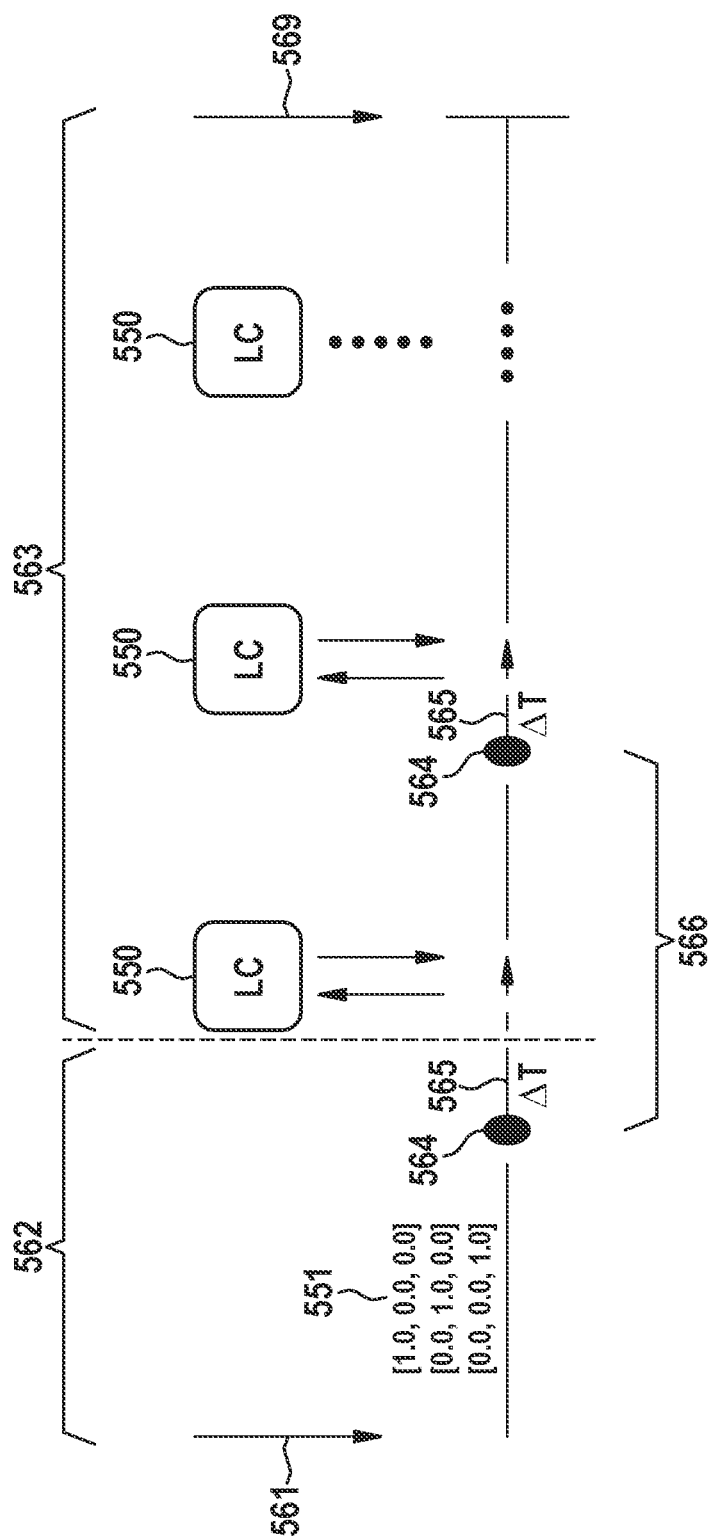

ON-THE-FLY CALIBRATION OF AN IMAGE CLASSIFIER

CROSS REFERENCE

The present application claims the benefit under 35 U.S.C. § 119 of European Patent Application No. EP 21 19 3766.9 filed on Aug. 30, 2021, which is expressly incorporated herein by reference in its entirety.

FIELD

The present invention relates to a computer-implemented method of training an image classifier, and to a corresponding system. The present invention further relates to a computer-implemented method of using a trained image classifier, and to a corresponding system. The present invention further relates to a computer-readable medium.

BACKGROUND INFORMATION

Machine learnable techniques for image classification, such as deep neural networks, can nowadays surpass traditional methods in computer vision tasks and are being deployed more and more in life-crucial applications, such as driver assistance system and medical imaging. In these types of applications, it is important not just that the image classifier outputs the correct classification (e.g., predicts the correct class for the image in multi-class classification, detects the right object(s) in the image in object detection, or predicts correct classes for respective portions of the input image in image segmentation). It is also important that the image classifier can accurately estimate likelihoods, e.g., can output a class probability for a class that accurately represents a likelihood of that class being correct. For example, a driver assistance system may use these probabilities to weigh the importance of the classification with respect to other available measurements of the environment, or to switch to a safe mode in case the image classifier is uncertain.

Many image classifiers fail to estimate correct likelihood for unseen data. This phenomenon is referred to as miscalibration and often results in over-confidence of the image classifier. This is a problem for high-assurance settings. For example, if a self-driving car recognizes a stop sign as a no-speed-limit sign with very high confidence, an accident may happen and jeopardize human life. Classifiers that output predictions with appropriate confidence matching their accuracy, are desired. Deviation of confidence from ground truth can be measured according to various metrics, e.g., Expected Calibration Error and Negative Log Likelihood.

Generally, two types of techniques are in the related art to improve the calibration of image classifiers: post-hoc calibration and on-the-fly calibration. In post-hoc calibration, the image classifier itself remains unchanged, but a trained calibration model is applied to its outputs. On-the-fly calibration changes the way the image classifier is trained. A conventional on-the-fly calibration method is called Label Smoothing and is disclosed in C. Szegedy et al., "Rethinking the Inception Architecture for Computer Vision", Proceedings CVPR 2016 (available at https://arxiv.org/abs/1512.00567 and incorporated herein by reference). Instead of training the image classifier using label vectors that represent one-hot encodings of the class labels, Label Smoothing assigns a small but nonzero probability mass on every non-target class of the label vectors. This results in image classifiers that output lower confidence for evaluation samples since the ground truth distribution is less spiky. Although this reduces the overconfidence problem, there is still a need to further improve the likelihood estimates of image classifiers.

SUMMARY

In accordance with a first aspect of the present invention, a computer-implemented method of training an image classifier and a corresponding system are provided. In accordance with another aspect of the present invention, a computer-implemented method of using a trained image classifier and a corresponding system are provided. In accordance with an aspect of the present invention, a computer-readable medium is described.

Various aspects relate to an on-the-fly calibration technique for image classification, and to image classifiers trained according to such an on-the-fly calibration technique. The image classifier may be configured to determine a prediction vector for an input image. The prediction vector may comprise class probabilities for multiple respective classes, for example, for the overall image if the image classifier is a multi-class classifier or for respective portions of the input image if the image classifier is a multi-class semantic segmentation model. An aim of the provided techniques is to improve the likelihood estimates formed by the class probabilities that are output by the image classifier.

An image classifier may be trained by performing respective training steps. In such a training step, the image classifier may be applied to a training image according to current values of its trainable parameters, resulting in a current prediction vector. A training signal may be derived by comparing the current prediction vector to a label vector. In the related art, this label vector is typically a one-hot encoding of a known class label. In label smoothing, this one-hot encoding is smoothened. Based on this training signal, the trainable parameters of the image classifier may be updated, for example, by gradient descent. Typically, the training of an image classifier comprises multiple such training steps, e.g., performed over multiple epochs.

The inventors studied the way that the conventional label smoothing works, and found a number of factors that weaken its efficacy. In particular, label smoothing uses a constant smoothing factor throughout the training, which reduces its efficacy in mitigating miscalibration. The inventors found that label smoothing can reduce overconfidence in earlier phases of training, but in later training phases, the previous smoothing factor is too big and does not fit contemporary status of the model. In other words, the inventors realized that label smoothing effectively overkills and renders some predictions underconfident in the later phase of training. Due to the introduction of this new miscalibration, label smoothing may shrink its advantage over baseline at the end of training.

Another aspect of the conventional label smoothing is its use of a uniform distribution over non-target classes. This is undesirable, since a more accurate relative error of non-target classes leads to a more effective training signal. For example, the probability of an arbitrary "car" image being misclassified for "truck" may be expected to be larger than it being misclassified for "carrot", since "car" shares more features with "truck" than "carrot". As the inventors realized, label smoothing effectively eliminates this relative error information, leading to sub-optimal training performance.

Still another aspect of the conventional label smoothing is that it takes the same label for every sample in a class. For instance, in the class "baby" of the CIFAR-100 dataset, some samples will be "baby girl" while others are "baby boy". Besides target class "baby" for both, larger probability mass for non-target class "girl" for the former group of samples may be expected whereas a larger probability mass for non-target class "boy" for the latter is reasonable, considering the features shared across these classes. The inventors realized that, since label smoothing does not take this kind of adaptability into account, it has a reduced effectiveness in reducing miscalibration.

Interestingly, the inventors found an effective on-the-fly calibration technique that improves the likelihood estimates provided by related art image classifiers. According to this technique, the image classifier is trained using label vectors that, for training images which the image classifier currently classifies correctly, are determined as soft labels based on the prediction vector output by the image classifier itself. A soft label is a label vector that comprises multiple nonzero probabilities, as opposed to a hard label, also known as a one-hot encoding.

Generally, at a point during the training of the image classifier, one or more initial training steps have been performed, resulting in current parameter values for the trainable parameters of the image classifier. The image classifier may be used according to these current parameter values to determine calibrated label vectors. Namely, the image classifier may be applied according to the current parameter values to a training image, resulting in a prediction vector of class probabilities for the training images. A predicted class may be inferred from the prediction vector, and compared to the ground truth class label of the training dataset. If the predicted class is equal to the class label, a soft label may be determined based on the prediction vector and used for subsequent training steps.

Thus, according to the provided techniques according to the present invention, a training step of the image classifier may be performed using a label vector that is determined based on the current state of the image classifier, or at least a relatively recent one, e.g., determined in a current or previous training phase. In particular, at a point during the training, the image classifier may be used according to the same set of parameters both to determine a label vector, and to perform a training step in which the parameters are updated, e.g., by gradient descent. The label vectors may be updated multiple times during the training, e.g., after a fixed number of training epochs has been performed, or once every training phases. Thereby, the current label vectors used to train the image class may be determined based on temporally calibrated correct predictions of the image classifier.

The provided on-the-fly calibration technique, referred to as Label Smoothing from Predictions (LSP), has a number of advantages. By using predictions as soft labels, the training actively stops the image classifier from generating high confidence for semantically ambiguous and improperly labelled samples. On the other hand, because predictions are used, it does not introduce unnecessary under-confidence. As a result, it was found that the provided techniques surpass state-of-the-art techniques across various datasets and image classifier architectures. LSP also shows good compatibility with different post-hoc calibration methods, and with a wide range of training techniques and schedules. E.g., given an image classifier for which a suitable training schedule is known, the image classifier can be re-trained with LSP using the same training schedule with little or no hyperparameter customization. Compared to post-hoc calibration, the provided techniques have improved efficacy while avoiding the overhead of having an additional calibration component, and requiring less training data, since there is no need for an additional hold-out set for training the post-hoc calibration. Compared to fully probabilistic models such as Bayesian models, image classifiers trained as described herein are more efficient to train and use, and thus applicable to larger and more complex data, and typically also deliver higher accuracy.

In particular, the inventors identified several types of training images that can cause miscalibration. For training datasets including training images of one or more of these types, the provided techniques are particularly effective. Generally, these types of training images are semantically ambiguous and/or improperly labelled. In particular, the following six types were identified: (a) multiple objects, e.g., a train and a forest coexist in the same image; (b) a single object belonging to two classes, e.g., the object could be maple tree and forest at the same time; (c) a single object being unrecognizable, e.g., due to low resolution, bad illumination or similar features, it is hard to tell whether it is a kangaroo or a squirrel; (d) a single object being atypical in its class, e.g., most pears in the training set look like real objects, but this pear looks like cartoon; (e) a single object being occluded, e.g., the head of a crocodile is occluded; (f) a single object being improperly labelled, e.g., a much more appropriate label is road rather than plain. According to related art techniques, hard labels encourage the image classifier to output predictions with 100% confidence for these samples and neglect their intrinsic uncertainty. As a consequence, a trained image classifier may overfit to these samples and be miscalibrated. On the contrary, LSP uses calibrated soft labels to train the image classifier, thus maintaining natural uncertainty in the modified ground truth and rendering the image classifier less overconfident.

Importantly, the label vectors used in training may be based on predictions of the image classifier itself and may be updated as the training of the image classifier progresses. This is in contrast to knowledge distillation techniques that use predictions by another pre-trained classifier. Such techniques may be useful for example to train a simpler model using a more advanced model, but do not help to reduce overconfidence as is done with the provided techniques.

Image classifiers trained as described herein may be used in various ways. Given an input image, the image classifier may be applied to determine a prediction vector for the input image, and a prediction may be output based on the prediction vector. The prediction can for example be a classification into a class, a class probability for a specific class, or the prediction vector of class probabilities itself. By using the provided techniques, for example, predicted class probabilities may be output that are more accurate and that can thus be used for example more safely in a control system. It was also found that the classifications of the image classifier may be more accurate, in particular, that the image classifier generalizes better to unseen examples. Thus, also when just outputting a classification into a particular class, classifiers trained as described are advantageous. Also an improvement in the ability to recognize out-of-distribution samples was found, as also discussed elsewhere. Finally, also the performance of the image classifier as a feature extractor is improved. To this end, instead of applying the full image classifier to an input image, only an initial part may be applied, e.g., a convolutional part possibly followed by a subset of fully connected layers of the model, thus obtaining a feature space representation of the input image. Also this feature space representation was found to generalize better to unseen examples due to the use of the provided techniques.

Optionally, a determined current label vector of a training image may be used in multiple training steps of training the image classifier on the training image. For example, a label vector may be determined for a training image of the training dataset, after which multiple epochs of the training may be performed using this label vector, for example, at least 10 or at least 20 epochs. This increases the efficiency and stability of the training compared to updating the label vector for an image for each training step that is performed on the image. Essentially, it avoids the label vector becoming a moving target that the training cannot converge to.

Optionally, one or more initial training steps of training the image classifier may be performed using label vectors that are determined independently of the image classifier, e.g., as one-hot encodings of the class labels. Accordingly, the training may comprise a first part in which label vectors derived from the class labels are used, followed by a second part in which, for correct classifications, soft labels based on prediction vectors are used and optionally updated during this second part. In the first part, sufficient accuracy and elimination of bias may be reached so that the second part of the training can be particularly effective. Not performing such initial training steps may deteriorate performance of the trained image classifier. A good choice is for the first part to last until a predefined number of epochs (e.g. one or two) after a first decaying of the learning rate, for example.

Optionally, the training may be performed in multiple training phases, where such a training phase starts with a learning rate decay. It was found to be advantageous to update the label vectors during such a training phase only after a number of training steps have been performed, for example, one, two, or another fixed number of epochs into the training phase. This has the advantage that the updated label vectors can use the boost of confidence and accuracy associated with the learning rate decay, since this boost typically takes a number of training steps to take place. The remainder of the training phase may then use the updated label vectors and the decayed learning rate, for example.

In particular, one or more previous training steps of the image classifier may be performed according to a previous learning rate and according to previous label vectors, after which the previous learning rate may be decayed. After the learning rate decay, one or more further training steps of training the image classifier may be performed that use the decayed learning rate and the previous label vectors, leading to updated parameter values for the trainable parameters. The label vectors for the training images may then be updated by applying the image classifier according to the updated parameter values, and the updated label vectors may then be used to perform further training steps of the phase. For example, the label vectors may be updated after each learning rate decay, after every other learning rate decay, etc.

Optionally, the training step performed between the decaying of the learning rate and the updating of the label vectors, form one training epoch. This was found to be a good choice for most architectures and datasets, since it allows the mentioned boost to kick in sufficiently, but allows the remaining of the phase to use the updated labels.

Optionally, if the class predicted for a training image by the image classifier is not equal to the class label for that training image, the current label vector may be determined based on the class label, independently of the prediction vector. For example, the label vector may be set to a one-hot encoding of the class label. Although it is also possible to use a soft label, e.g., according to the related art label smoothening, it was found to be preferable to use a hard one-hot encoding: this encourages the model to correctly classify the image, and already has the effect of decreasing the confidence of the model in its wrong prediction so that using soft labels is not needed.

Optionally, the provided techniques may be combined with a post-hoc calibration model. The post-hoc calibration model may be applied during training to determine the current label vector from the prediction vector. The predicted class may be inferred either from the original prediction vector or from the result of the post-hoc classification; both are possible since the post-hoc classification typically does not affect the predicted class. The post-hoc classification is not applied when applying the image classifier as part of a training step, however. In use, the post-hoc calibration model may be applied to the prediction vector determined by the image classifier. Interestingly, it was found that by combining on-the-fly calibration as described herein with a post-hoc calibration method, and in particular by using the post-hoc calibration already during the on-the-fly calibration-based training, overall better-calibrated likelihoods can be obtained than applying either technique separately. Various post-hoc calibration methods are available in the related art and can be used herein, e.g., scaling methods such as Temperature Scaling and latent Gaussian processes; or binning methods such as histogram binning, in particular I-MAX.

Optionally, the post-hoc calibration model may be trained for the image classifier, e.g., every time the post-hoc calibration model is applied on a new set of parameter values of the image classifier. This way, throughout the training, the post-hoc calibration model may evolve along with the image classifier.

Optionally, in use, the trained image classifier may be used to determine an out-of-distribution score for an input image from the prediction vector output by the image classifier. For example, the out-of-distribution score may be determined based on the entropy of the prediction vector. Interestingly, it was found that, as an extra advantage of being less overconfident, the provided techniques can improve the ability of the image classifier to recognize out-of-distribution samples. Many conventional image classifiers are prone to output high confidence for out-of-distribution samples. It was observed that, also in terms of determining out-of-distribution score, the provided techniques outperform related art on-the-fly calibration methods. Also a small variance was observed for the provided techniques, showing their robustness over different data and architectures.

Generally, the provided techniques apply to various types of image data, including video data, radar data, LiDAR data, ultrasonic data, motion data, thermal images, or sonar data. The images data can be represented, for example, by pixel values (e.g., for 2D image data), voxel values (e.g., for 3D image data), or a point cloud (e.g., for 2D or 3D image data). The image data can also represent various types of sensor data such as ECG data represented as an ECG image, audio data represented by a spectrogram, etc.

In particular, images input to the image classifier may represent a computer-controlled system and/or its environment, and using the image classifier, control data may be inferred for controlling the computer-controlled system. For example, the system may be a vehicle, such as an autonomous or semiautonomous vehicle, a robot, a manufacturing machine, a building, etc. In principle, the provided techniques may be applied to other types of data, e.g., sensor data such as time series of sensor measurements, as well.

Various model architectures and parameters can be used for the image classifier, as appropriate for the types of data and kind of contents at hand. For example, the image classifier may be a deep neural network, e.g., a convolutional neural network or a fully convolutional neural network. The image classifier may be a semantic segmentation model configured to compute class probabilities for respective portions of the input image.

Optionally, a feature space representation obtained by applying a part of the trained image classifier may be used as an input to a further trained model. The further trained model may be used to infer control data for controlling a computer-controlled system, for example. Thus, the image classifier may be used as a basis for other downstream tasks. This way, the image classifier may be used as a feature extractors whose knowledge is imparted to such other tasks via transfer learning. Since uncertainty calibration is improved for the classification task of the image classifier, corresponding better predictive uncertainties in downstream tasks can be obtained.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

FIG. 5A shows a detailed example of how to train a classifier, according to the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
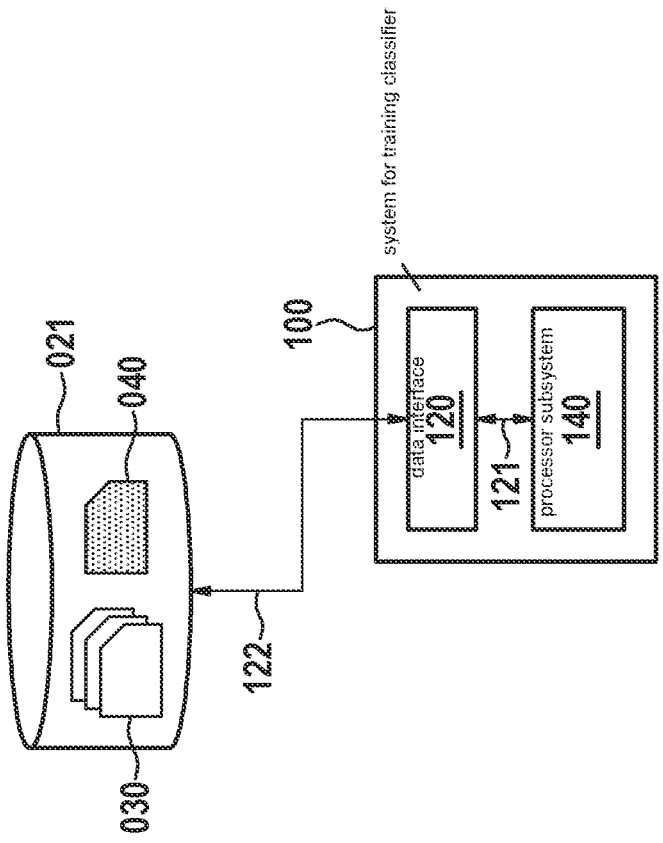
FIG. 1 shows a system for training a classifier, according to an example embodiment of the present invention.

FIG. 1 shows a system 100 for training a classifier. The classifier may be configured to determine a prediction vector for an input instance. For example, the classifier may be an image classifier acting on an input image. The prediction vector may comprise class probabilities for multiple respective classes.

The system 100 may comprise a data interface 120. Data interface 120 may be for accessing a training dataset 030 comprising multiple training instances and corresponding class labels. For example, the number of training instances may be at least 1000, at least 10000, or at least 100000. Instead or in addition, data interface 120 may be for accessing trainable parameters 040 of the classifier. The parameters 040 may be for using the classifier according to a method described herein, e.g., by system 200 of FIG. 2 or system 300 of FIG. 3.

For example, as also illustrated in FIG. 1, the data interface 120 may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of data storage interface 120. Each subsystem may be of a type as is described above for data storage interface 120.

The system 100 may further comprise a processor subsystem 140 which may be configured to, during operation of the system 100, train the classifier. The training by processor subsystem 140 may comprise performing one or more initial training steps of training the classifier to obtain current parameter values for the trainable parameters 040. The training by processor subsystem 140 may comprise selecting a training instance and a corresponding class label from the training dataset 030. The training by processor subsystem 140 may comprise determining a current label vector for training the classifier on the training instance. To determine the current label, the processor subsystem 140 may apply the classifier to the training instance according to the current parameter values to obtain a prediction vector; infer a predicted class of the multiple classes from the prediction vector; compare the predicted class to the class label; and, if the predicted class is equal to the class label, determine the current label vector as a soft label based on the prediction vector. The training by processor subsystem 140 may comprise performing a current training step of training the classifier on the training instance using the current label vector.

The system 100 may further comprise an output interface for outputting trained data 040 representing parameters of the learned (or 'trained') model. For example, as also illustrated in FIG. 1, the output interface may be constituted by the data interface 120, with said interface being in these embodiments an input/output ('IO') interface, via which the trained parameters 040 may be stored in the data storage 021. For example, the trainable parameters of the 'untrained' model may during or after the training be replaced, at least in part, by the trained parameters, such as weights and other types of parameters of neural networks, to reflect the training on the training data 030. This is also illustrated in FIG. 1 by the record 040 representing to both the untrained and the trained parameters. In other embodiments, the trained parameters 040 may be stored separately from the 'untrained' parameters. In some embodiments, the output interface may be separate from the data storage interface 120, but may in general be of a type as described above for the data storage interface 120.

Figure 2:
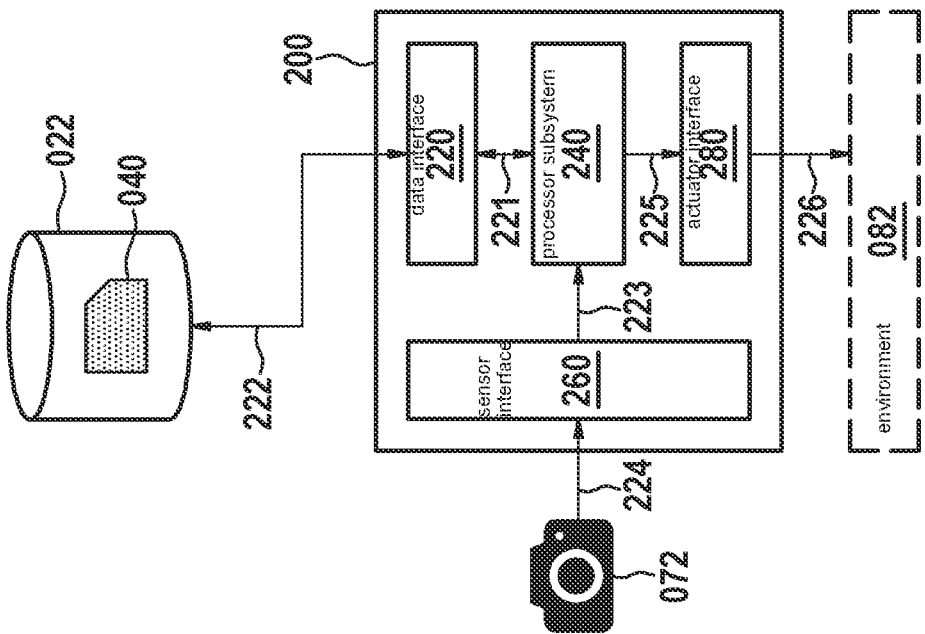
FIG. 2 shows a system for using a classifier, according to an example embodiment of the present invention.

FIG. 2 shows a system 200 for using a classifier trained as described herein, e.g., by device 100 of FIG. 1. The system 200 may comprise a data interface 220 for accessing trained parameters 040 of the classifier. The system may train the model in addition to using it, e.g., may be combined with the system of FIG. 1.

For example, as also illustrated in FIG. 2, the data interface may be constituted by a data storage interface 220 which may access the data 040 from a data storage 022. In general, the data interface 220 and the data storage 022 may be of a same type as described with reference to FIG. 1 for the data interface 120 and the data storage 021. The storage may be part of system 200. While not shown in this figure, the storage 022 may also comprise an input instance to which the classifier may be applied.

The system 200 may further comprise a processor subsystem 240 which may be configured to, during operation of the system 200, obtain an input instance, e.g., an input image. The processor subsystem 240 may be further configured to apply the classifier to the input instance to determine a prediction vector for the input instance, and to output a prediction based on the prediction vector. Instead or in addition, the processor subsystem 240 may be configured to apply a part of the classifier to the input instance to obtain a feature space representation of the input instance, and to output the feature space representation.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

FIG. 2 further shows various optional components of the system 200. For example, in some embodiments, the system 200 may comprise a sensor interface 260 for directly accessing sensor data 224 acquired by a sensor 072 in an environment 082. The sensor may be arranged in environment 082 but may also be arranged remotely from the environment 082, for example if the quantity(s) can be measured remotely. The sensor 072 may but does not need to be part of the system 200. The sensor 072 may have any suitable form, such as an image sensor, a lidar sensor, a radar sensor, a pressure sensor, a contain temperature sensor, etc. For example, as shown in the figure, the sensor 072 may be a camera capturing an input image 226 representing the system 200 and/or its environment. The sensor data interface 260 may have any suitable form corresponding in type to the type of sensor, including but not limited to a low-level communication interface, e.g., based on I2C or SPI data communication, or a data storage interface of a type as described above for the data interface 220.

In some embodiments, the system 200 may comprise an actuator interface 280 for providing control data 226 to an actuator (not shown) in the environment 082. Such control data 226 may be generated by the processor subsystem 240 to control the actuator based on using the classifier, e.g., based on a prediction by the classifier, or based on a feature space representation obtained by applying part of the classifier, and applying a further trained model to the feature space representation to infer the control data 226. The actuator may be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-)autonomous vehicle.

In other embodiments (not shown in FIG. 2), the system 200 may comprise an output interface to a rendering device, such as a display, a light source, a loudspeaker, a vibration motor, etc., which may be used to generate a sensory perceptible output signal which may be generated based on using the classifier. The sensory perceptible output signal may be directly indicative of a classification, class probability, and/or feature space representation output by the classifier, but may also represent a derived sensory perceptible output signal, e.g., for use in guidance, navigation or other type of control of the system 200.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar physical entity, and/or may be represent a control system configured to control the physical entity.

Figure 3:
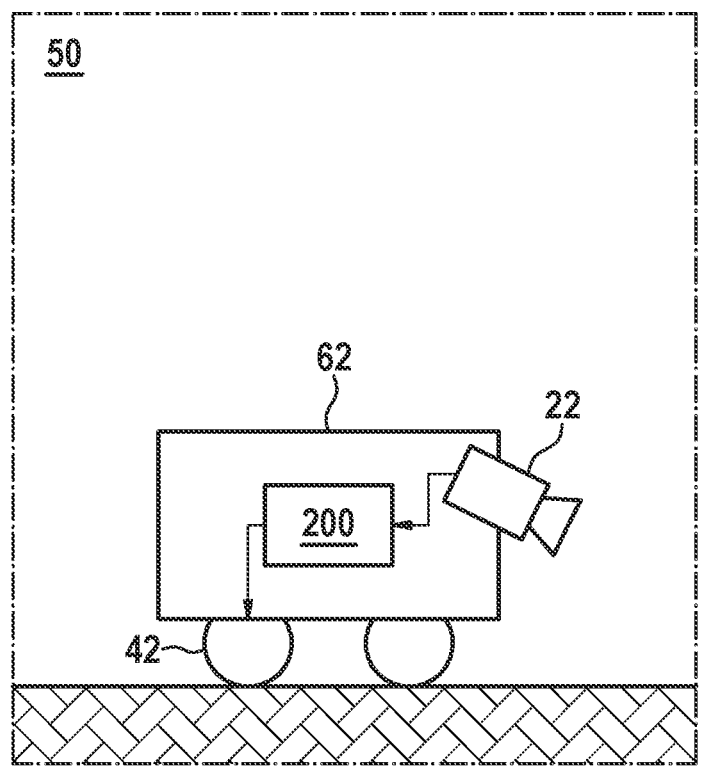
FIG. 3 shows a detailed example of use of a classifier, according to the present invention.

FIG. 3 shows an example of the above, in that the system 200 is shown to be a control system of an (semi-)autonomous vehicle 62 operating in an environment 50. The autonomous vehicle 62 may be autonomous in that it may comprise an autonomous driving system or a driving assistant system, with the latter also being referred to as a semiautonomous system. The autonomous vehicle 62 may for example incorporate the system 200 to control the steering and the braking of the autonomous vehicle based on sensor data obtained from a video camera 22 integrated into the vehicle 62. For example, the system 200 may control an electric motor 42 to perform (regenerative) braking in case of an unexpected traffic situation, e.g., if the autonomous vehicle 62 is expected to collide with a traffic participant. The system 200 may control the steering and/or braking to dangerous situations, e.g., to avoid collision with the traffic participant. The system 200 may apply the image classifier to an input image provided by the video camera. The system may for example determine that a classification by the image classifier does or does not have a class probability exceeding a threshold, or that the input image does or does not have an out-of-distribution score exceeding a threshold. Based on this, the system 200 may for example decide to use a classification or prediction vector to control the vehicle 62 (e.g., if the class probability and/or the out-of-distribution score indicates sufficient confidence), or to use a fallback control mechanism, e.g., a braking mechanism, instead (e.g., if the class probability and/or out-of-distribution score indicates insufficient confidence).

Several bottlenecks of the related art on-the-fly calibration method Label Smoothing (LS) are now evaluated and discussed. Label smoothing determines label vectors using only ground truth class labels, not prediction vectors by the classifier itself. LS is compared to a cross-entropy one-hot coding baseline on the dataset CIFAR-100 for WRN-28-10. Smoothing factor 0.1 is used. Several bottlenecks were identified.

Constant smoothing factor over time: Using Expected Calibration Error (ECE), it can be empirically investigated how far models deviate from being well calibrated. However, the sign of deviation is unknown in this case, since the absolute difference computation in ECE eliminates this information. Accordingly, an alternative metric is proposed called FlatECE, replacing the absolute difference in ECE with a summation. FlatECE may be formally defined as:

$$FlatECE = \sum_{m=1}^{M} \frac{|B_m|}{N}(Conf_m - Acc_m).$$

If all bins are overconfident, e.g., $\forall m$, $Conf_m - Acc_m > 0$, FlatECE is equivalent to ECE. When some bins are underconfident, FlatECE is smaller than ECE, and even equal to negative ECE when all bins are underconfident. The inventors computed the ECE and FlatECE for LS-0.1. Three learning rate decays split the training into four phases. In phase one and phase two, LS-0.1 has much lower ECE than baseline, which shows LS-0.1's effectiveness in cancelling overconfidence of classifiers. But in the phase three and the phase four, the ECE advantage of LS-0.1 over baseline shrinks markedly. For LS-0.1, progressively splitting curves of FlatECE and ECE indicate that most calibration error of LS-0.1 in phase three and four actually comes from growth of underconfidence. Since early stopping is a trade-off between generalization and calibration, stopping training and taking the current checkpoint is not a feasible option. It is concluded that the smoothing factor 0.1 overkills at this point and causes underconfidence. If it is adjusted, here: reduced, dynamically, better calibration performance after the complete training may be expected.

Constant Smoothing Factor over Various Classes and Instances: LS assumes uniform distributed probabilities for all non-target classes. This assumption can be criticized. It is intuitive that some non-target class's probability is higher than other non-target classes. For instance, for images labelled as cars in CIFAR-10, without looking at a specific image, a larger non-target probability mass should be assigned on trucks rather than cats or dogs. Because trucks have more similar appearances to cars than to cats or dogs.

Another assumption in LS is the same smoothed label for every sample in a class. That means the same features are assumed shared across different samples in a class. Counterexamples can be raised. For instance, consider two images that are annotated as baby. In one photo, the baby may look slightly more "feminine" than the baby on the left and has more "female" features. In this case, the non-target class girl should be given a larger probabilistic weight than in the other photo.

Figure 4:
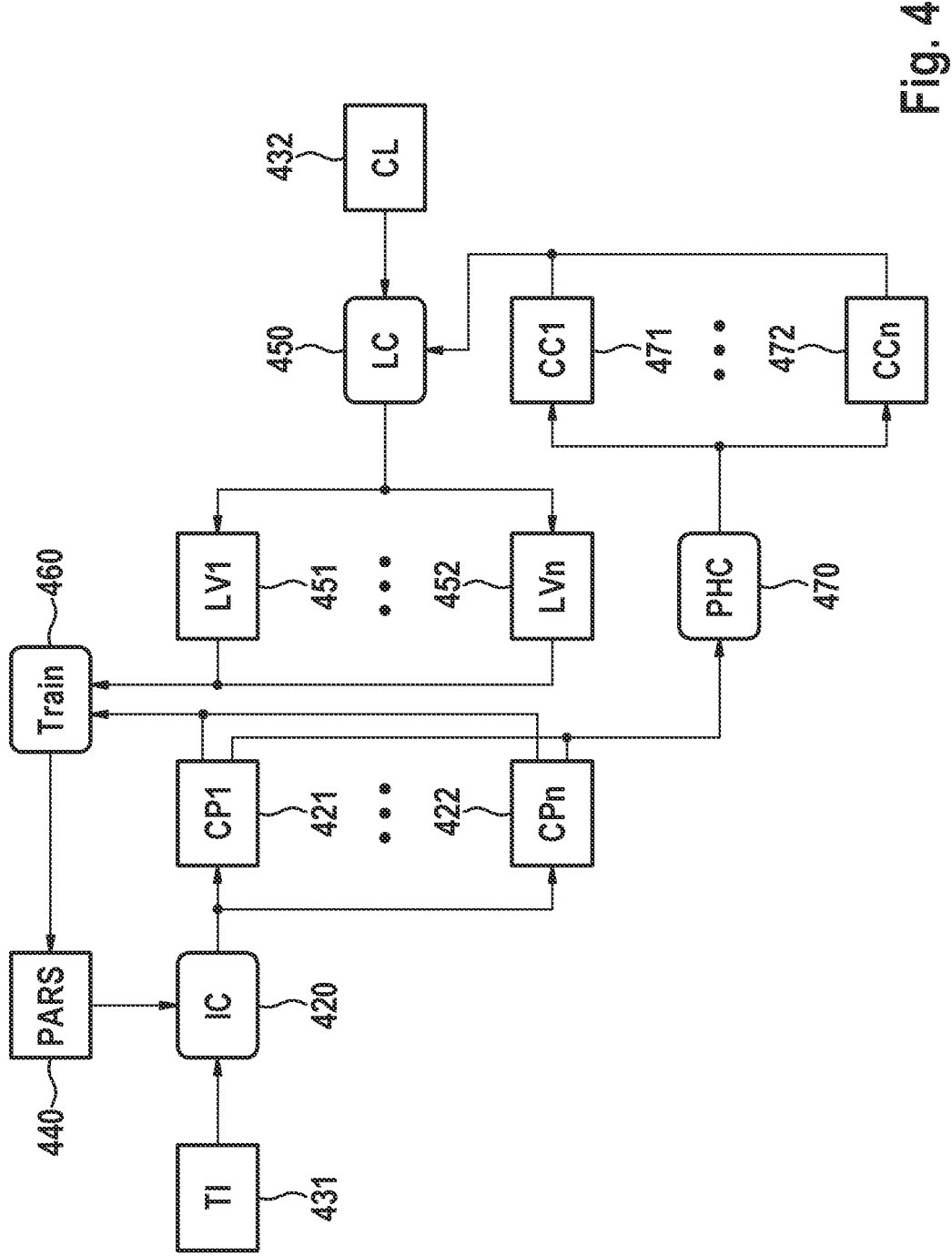
FIG. 4 shows a detailed example of how to train a classifier, according to the present invention.

FIG. 4 shows a detailed, yet non-limiting, example of how to train a classifier. As an illustrative example, an image classifier is used.

The image classifier IC, 420, may be applied to an input image. For example, the figure shows the image classifier IC being applied to a training image TI, 431 of a training dataset. Generally, the input images can be represented in various different ways, e.g., by pixel values (e.g., at least 128, or at least 1024 pixels), voxel values (e.g., at least 128, or at least 1024 voxels), or a point cloud (e.g., at least 1024, or at least 4096 points of the point cloud). The images can e.g. be black-and-white, greyscale, or colour images.

The image classifier IC may be configured to determine a prediction vector for an input image. The prediction vector may comprise class probabilities for multiple respective classes. For example, the figure shows the image classifier IC being applied to training image TI, 431, to obtain class probabilities CP1, 421, . . . , CPn, 422. For example, the number of classes may be at least 3, at least 10, or at least 20. The training image may have a ground truth class label CL, 432 according to the training dataset, e.g., a single class to which the training image TI is assigned. While not shown in this figure, the image classifier IC can be a semantic segmentation model configured to output sets of class probabilities CP1, . . . , CPn for respective portions, e.g., pixels, of the input image, in which case the training dataset may comprise, for a training image TI, respective class labels CL assigning classes to the respective portions of the training image TI.

The image classifier IC can have various conventional model architectures as appropriate for the input images to which it is to be applied. The image classifier may be parameterized by a set of trainable parameters PARS, 440. The number of trainable parameters can be at least 1000, at least 10000, or at least 100000, for example. The image classifier IC can for example be a neural network, such as a deep neural network or a convolutional neural network. In this case, the set of parameters may comprise weights of nodes of the neural network, for example. An example of such an image classifier is described with respect to FIG. 6.

As shown in the figure, the image classifier IC may be trained in a training operation Train, 460. The training Train can be a training from the related art, except that it uses label vectors determined as described herein. For example, the training can use hyperparameters and/or a training schedule known to work well on the data at hand. Generally, the training may comprise respective training steps in which the image classifier IC is applied to respective training images TI. In such a training step, the image classifier IC may be applied to the training image TI according to current values of its trainable parameters PARS, resulting in a current prediction vector CP1, . . . , CPn. The training Train may derive a training signal by comparing the current prediction vector CPi to a label vector LV1, 451, . . . , LVn, 452 for the training image TI, and update the parameters PARS based on the training signal.

In one example, the image classifier IC may be a multi-class classifier, say for K>2 classes. Letting $D=\{(x_i, y_i)\}_{i=1}^{N}$ be a training dataset composed of N samples, where for sample i, the training image TI, $x_i$ is the input of the image classifier IC and $y_i = [y_{i,1}, \ldots, y_{i,j}, \ldots, y_{i,K}] \in [0,1]^K$ such that $\Sigma_{j=1}^{K} y_{i,j} = 1$ is the label vector LVi. The most promising class index of sample i is $s_i = \text{argmax}_{i \leq j \leq K} y_{i,j}$. For example, the label vector may be a hard label, in other words a one-hot encoding, of the class label: $y_{i,j=s_i} = 1$ and $y_{i,j \neq s_i} = 0$. The multi-class classifier IC may match $x_i$ onto a probabilistic prediction vector CPi $q_i = [q_{i,1}, \ldots, q_{i,j}, \ldots, q_{i,K}] \in [0,1]^K$ such that $\sum_{j=1}^{K} q_{i,j}=1$. Training the image classifier IC in this case may comprise performing an optimization to minimize a cross-entropy loss, e.g., $$L_{CE} = -\frac{1}{n}\sum_{i=1}^{n}\sum_{j=1}^{K} y_{i,j}\log q_{i,j},$$

where n is the number of samples in an optimization iteration.

For example, training Train may be performed using stochastic approaches such as stochastic gradient descent, e.g., using the Adam optimizer as disclosed in Kingma and Ba, "Adam: A Method for Stochastic Optimization" (incorporated herein by reference and available at https://arxiv.org/abs/1412.6980). Such optimization methods may be heuristic and/or arrive at a local optimum. Training may be performed on an instance-by-instance basis or in batches, e.g., of at most or at least 64 or at most or at least 256 instances.

Further shown is a label calibration operation LC, 450, that determines the label vectors LVi used by training Train. Interestingly, in embodiments described herein, the label vectors LVi for a training image TI may be determined based on the prediction vector CPi obtained by applying the image classifier IC according to its current set of parameters PARS to the training image TI.

Typically, during one or more initial training steps of the training the image classifier IC, the label vector LVi is determined by operation LC independently of classifications or class probabilities determined by the image classifier IC. For example, the label vector LVi may be set to a one-hot encoding of the class label LC, or similar.

At a point during the training, the label calibration operation LC may update a label vector LVi for a training image TI. This is typically not done for every training step that is performed on the training image, but less often, e.g., once for every decay in the learning rate. Detailed examples of when the label vector LVi may be updated, are provided with respect to FIG. 5. Typically, label calibration operation LC updates the label vectors of all images in the training dataset, although this is not needed.

To update label vector LVi for training image TI, an inference may be carried out using the image classifier IC according to its current parameter values to obtain a prediction vector CPi for the training image TI. From this prediction vector, a predicted class for the training image TI may be inferred. The predictions may be split according to their correctness. For misclassified predictions, there is no clue for their soft labels. The label vector LVi may in this case be set to a one-hot coding label representing a hard label for the class label CL, or may be otherwise determined determining independently of the prediction vector, e.g., by as a smoothened one-hot label corresponding to the class label.

On the other hand, for correctly classified samples, the label vector LVi may be set based on the prediction vector CPi. In particular, one possibility is to set the label vector LVi equal to the prediction vector CPi.

As also shown in the figure, a measure to further improve calibration performance, is to apply a post-hoc calibration model PHC, 470, to the prediction vector CPi, and use the post-hoc calibrated predictions CC1, 471, . . . , CCn, 472, rather than the direct predictions CPi as soft labels LVi in the calibration framework.

In principle, any post-hoc calibrator PHC can be used. The post-hoc calibrator can for example be a scaling post-hoc calibrator. Such a method may scale raw outputs, e.g., logits, of the image classifier up or down using a continuous calibration function. For example, the scaling post-hoc calibrator can be temperature scaling (TS) or a latent Gaussian Process (GP). In temperature scaling, logits may be divided by a temperature factor T, which may be obtained by optimizing NLL on a validation set. Latent Gaussian Process (GP) may learn a continuous curve rather than a single temperature factor. For the negative log-likelihood (NLL) metric, GP was found experimentally to outperform TS in most situations. For the Expected Calibration Error (ECE) metric, TS was found to work better than GP when limited calibration samples are available. Otherwise, GP was found to work better due to its larger number of configurable parameters.

The post-hoc calibrator PHC can also be a binning post-hoc calibrator. A binning post-hoc calibrator may adjust the logits via a discrete binning function. For example, histogram binning may be used, in particular methods that optimize bin edges such as the I-MAX histogram binning method. I-MAX may further merge per-class predictions from calibration sets to increase efficiency of sampling. Generally, scaling methods may preserve accuracy of predictions but fail to have consistent performance on ECE when the bin number of the ECE evaluation varies. Binning methods may have more consistent performance on ECE, despite loss of accuracy due to quantification.

The post-hoc calibration model PHC is preferably trained for the image classifier IC according to its current parameters PARS, for example, every time it is applied according to updated parameters PARS. The training of the post-hoc calibration model PHC typically uses a hold-out set, e.g., a validation set, separate from the training dataset that is used to train the image classifier IC.

Accordingly, label vectors LVi determined by label calibration LC can be a) calibrated correct predictions and b) class-based, e.g., one-hot coding, labels for incorrect samples. The determined labels LVi may be used to train the image classifier for subsequent training steps, typically multiple training steps per training image TI. After this, the process of determining updated label vectors LVi may be performed again, this time using trained parameters PARS obtained as a result of the subsequent training steps. Thus, training steps Train and label calibrations LC may be alternated until the end of the training schedule, resulting in a natively well-calibrated image classifier IC that can be used in some embodiments without requiring an additional calibration layer.

FIG. 5A shows a detailed, yet non-limiting, example of how to train a classifier, e.g., an image classifier. This example is based on the example of FIG. 4 and illustrates at which point during the training a label calibration LC, 550, may be applied. As also discussed with respect to FIG. 4, a label calibration LC may determine label vectors, typically for all training images of the training dataset. Initially, the label vectors used during training may be determined independently from the image classifier being trained, e.g., as a one-hot encoding of the class label. At a point during the training, label calibration LC may use the image classifier according to current values for its trained parameters by setting label vectors of images that are classified correctly as soft labels based on the prediction vectors determined by the image classifier; for incorrectly classified images, label vectors may be determined independently of the prediction vectors, e.g., as hard labels.

In this example, image classifier is trained by Stochastic Gradient Descent (SGD) with a multi-step scheduler. Such training is conventional, for example in deep learning. The multi-step scheduling refers to the use of a learning rate that is decayed multiple times during the training. The period between learning rate decays may be referred to as a training phase. At the start 561 of the training, the learning rate may be relatively large. Typically, accuracy and confidence first increase and then stagnate at a certain level. After a number of training steps, e.g., a fixed number of epochs, a learning rate decay 564 may be performed to decrease the learning rate. This typically leads, after a few iterations, to a boost in accuracy and confidence, which may then stagnate at a new higher level, and so on.

As shown in the figure, the training may start using labels calibrated by label calibration LC at a point between the first and second learning rate decays. Waiting for the first learning rate decay has the advantage that typically, the training accuracy is sufficiently high, and predictions are less biased. After the learning rate decay, one or more training steps may be performed that use the decayed learning rate but still use the previous label vectors. For example, a fixed number of training epochs $\Delta T$, 565, may be performed, followed by the label calibration LC. After the label calibration, further training steps of the training phase may be performed according to the updated label vectors and the decayed learning rate, e.g., multiple epochs.

The time at the beginning of a training phase in which the previous label vectors are used, may be referred to as the waiting phase, referring to the typical training effect that the boost of accuracy and confidence takes place only after waiting for a few iterations after the learning rate decay. Predictions from epoch T after the learning rate decay generally coincide with the future predictions before the next learning rate decay, thus also avoiding extra miscalibration as in the conventional label smoothing. For most architectures and datasets, T=1 is found to be a good choice.

Also after subsequent learning rate decays, label calibration LC may be applied, and also in this case, a waiting phase may be applied, typically comprising the same number of training steps, e.g., $\Delta T$ epochs. For example, label calibration may be performed after each learning rate decay, once per training phase. However, variations are also possible, e.g., label calibration may be performed every other training phase, may be first performed after the second learning rate decay instead of the first, etc. Label calibration LC may be performed throughout the training until the end of the training 569 is reached. For example, the number of label calibrations that are performed based on using the image classifier may be at most or at least three or at most or at least five. It is possible to tune the waiting time, e.g., number of epochs $\Delta T$, and/or the label calibration frequency as hyperparameters.

Figure 5B:
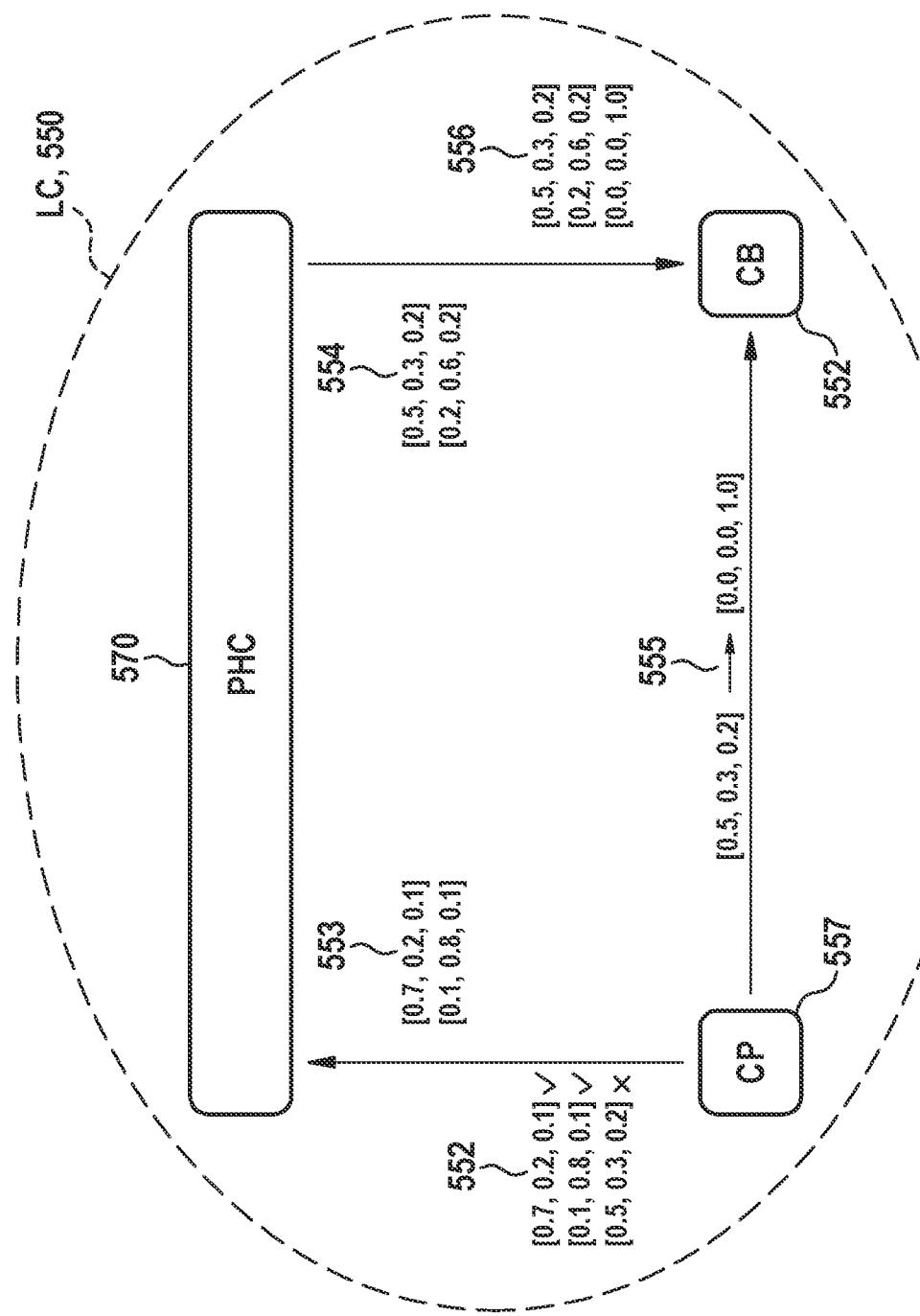
FIG. 5B shows a detailed example of a label calibration, according to the present invention.

FIG. 5B shows a detailed, yet non-limiting, example of a label calibration LC, 550. This label calibration LC can be used in combination with FIG. 4 and/or FIG. 5A to determine label vectors for training images using the image classifier.

The label calibration may LC may first apply the image classifier to training images according to current parameter values to obtain respective prediction vectors 552. The figure shows three such predictions: [0.7, 0.2, 0.1], [0.1, 0.8, 0.1] and [0.5, 0.3, 0.2]. The predictions may be split into two groups in a comparison operation CP, 557, by inferring a predicted class from the prediction vector, and comparing the predicted class to the class label. In this example, the predictions are split into two groups, correct predictions 553, [0.7, 0.2, 0.1] and [0.1, 0.8, 0.1] and an incorrect prediction 555, [0.5, 0.3, 0.2].

For images for which the predicted class is not equal to the class label, the label vector may be determined based on the class label independently of the prediction vector, e.g., as a one-hot encoding. In this example, because the incorrect prediction 555, [0.5, 0.3, 0.2] is likely to misguide the image classifier, original hard labels [0.0, 0.0, 1.0] for this sample are taken.

For images for which the predicted class is equal to the class label, the label vector may be determined as a soft label based on the prediction vector 553. In this example, to apply additional regularization on classifiers, the correct predictions are calibrated by a post-hoc calibration module PHC, 570, such as Temperature Scaling (TS) or latent Gaussian Process (GP). As an illustration, in the figure, calibrated soft labels 554, [0.5, 0.3, 0.2] and [0.2, 0.6, 0.2] are returned. The introduction of post-hoc calibration PHC enables negative feedback for the image classifier. For example, if TS is integrated, when the image classifier is severely overconfident, a temperature factor T>1 may be returned, causing soft labels to become smoother and therefore generating a stronger regularization. Over-confidence may be further mitigated in the future training and vice versa. An alternative is to use prediction that are not calibrated by a post-hoc calibration, in other words to apply an identity calibration.

Calibrated predictions 554 of correctly classified samples and model-independent labels 555 of misclassified samples may be combined CB, 552, as new soft labels 556, [0.5, 0.3, 0.2], [0.2, 0.6, 0.2] and [0.0, 0.0, 1.0] for future training.

Figure 6:
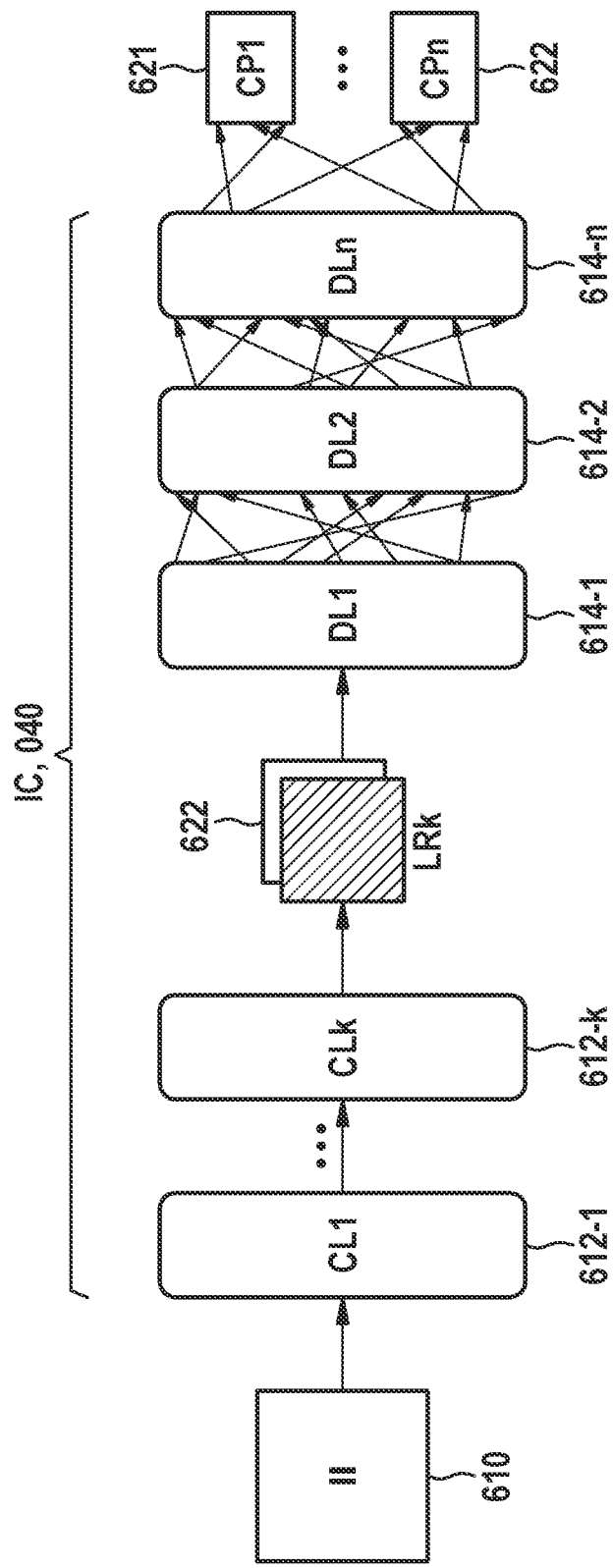
FIG. 6 shows a detailed example of an image classifier, according to the present invention.
Figure 9:
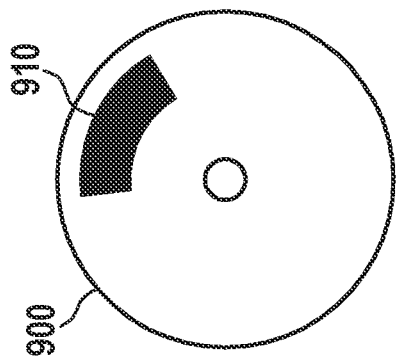
FIG. 9 shows a computer-readable medium comprising data, according to an example embodiment of the present invention.

FIG. 6 shows a detailed, yet non-limiting, example of a classifier IC, 040, for use with the techniques described herein. In this example, the classifier is a neural network classifier, in particular a deep neural network. The illustrated process describes, at a high level and greatly simplified, a classification of an input image in a convolutional neural network (CNN), for the sake of illustration. Other types of neural networks, such as deep neural networks, may also be used, as the skilled person will understand, and the following example is non-limiting and merely exemplary. In many cases, CNNs can be conceptually divided into two components: a convolutional part, comprising at least one convolutional layer, and a dense (e.g. fully-connected) part, comprising at least one dense layer. It is not necessary to have dense layers, however. For example, the trained classifier TC may be a fully convolutional neural network, e.g., not comprising any fully connected layers.

An input image II, 610 is input into image classifier IC, more specifically to a first layer CL1, 612-1 of filters (or in some cases, a single filter). Each of the filters may convolve over the input image II, 610, together producing an activation volume, or "latent representation". Each "slice" of the activation volume may be the output of one of said filters. The latent representation may have a different spatial resolution than the input image II. The latent representation may then be used as an input to subsequent layer, CL2, 612-2. The filter(s) of CL2 may then convolve over the latent representation output by the first layer CL1 to produce a second latent representation. This process may continue for further layers 612.

It should be noted that throughout the convolutional part of the CNN, the spatial relationship of latent representations to the input image is preserved, although the spatial dimensions of latent representations may differ from one latent representation to another, and from the spatial dimensions of the input image.

After the last layer CLk, 612-$k$ of the convolutional part of the CNN (often referred to as the last convolutional layer, although in some embodiments the last layer CLk of the convolutional part may not necessarily be a convolutional layer, provided it preserves the spatial relationship as discussed above), the resulting latent representation LRk, 622, is input into the first of the dense layers DL1, 614-1. The dense layers 614 may be fully-connected layers, in which the neurons of each fully-connected layer are connected to all of the neurons in another layer. After passing through the dense part of the CNN, class probabilities CP1, 621, ..., CPn, 622, for respective classes may be output.

In various embodiments, instead of using a trained image classifier by determining a prediction vector, it is also possible to use the trained image classifier by applying only a part of the trained image classifier to an input image to obtain a feature space representation of the input image. In the example image classifier IC of this figure, the feature space representation may be the output of a dense layer DLi of the image classifier. This feature space representation can have various upstream uses, for example, a further trained model may be applied to the feature space representation, for example to infer control data for controlling a computer-controlled system.

In various embodiments, the prediction vector output by an image classifier, e.g., class probabilities CPi of image classifier IC, may be used to determining an out-of-distribution score for the input image to which the model is applied. As an extra advantage of being less overconfident, image classifiers trained as described herein may have an improved ability to recognize out-of-distribution samples. Conventional image classifiers are prone to output high confidence for out-of-distribution samples. Thus, compared to determining an out-of-distribution score based on prediction vectors of a conventional image classifier, the use of a classifier trained as described herein may increase accuracy of the score. For example, entropy of predictions may be used to detect outlier samples. This can be done for any image classifier trained as described herein, not just for the CNN shown in the figure.

The use of image classifiers for determining out-of-distribution scores may be evaluated using a test set in which in-distribution and out-of-distribution samples have different labels. The inventors performed such an evaluation using entropy of predictions as threshold in AUC to detect outlier samples. CIFAR-10 was used as in-distribution data, while Street View House Number (SVHN) and CIFAR-10-C Gaussian Noise Severity 5 were used as out-of-distribution data. It was found that the provided techniques outperform other on-the-fly calibration methods across a number of tested dataset-network pairs. The variability is also small compared to other calibration methods, showing robustness over different data and architectures.

Some implementation details and evaluation results are now discussed. A widely used metric to measure how far confidence of a classifier deviates from accuracy is Expected Calibration Error (ECE). ECE mimics the behaviour of reliability diagram, considering top-1 predicted probability as confidence of a sample. Samples are sorted and split into M bins according to their confidence. ECE summarizes the weighted average difference between accuracy and average confidence following the equation:

$$ECE = \sum_{m=1}^{M} \frac{|B_m|}{N} |Conf_m - Acc_m|,$$

where $Conf_m$ and $Acc_m$ are the average confidence and accuracy of the bin m. $|B_m|$ refers to the number of samples in the corresponding bin. ECE typically uses a static binning scheme, but it is also possible to use a dynamic binning scheme, since most predictions densely locate on the right side of histogram.

The number of bins M is an important hyper-parameter. Too few bins may underestimate calibration error (biased), as much information may be smoothed. Too many bins may make the metric suffer from high variance. Traditionally, 15 bins are used, but in recent research also results using 100 bins have been reported. The inventors performed evaluations using 100-bin static binning, since it was found that, with 100 bins, different binning schemes do not change the ranking for different methods.

ECE is convenient and popular. However, besides its bias-variance trade-off, another issue of ECE is, trivial cases always exist to make ECE zero. That means that a classifier may be perfectly ECE-calibrated but output a fixed probability for any input, which is not desirable. It has been suggested in the literature to circumvent these issues by using negative log-likelihood (NLL) as a metric. NLL takes generalization and calibration into account. When two models have similar accuracy, the model with lower NLL suffers less from miscalibration.

For the evaluation, the proposed techniques are implemented using the software PyTorchImageClassification. For all network architectures, standard data augmentation (random cropping and random flipping) and He/Xavier initialization are taken. The experiments are repeated 5 times with different seeds. The training hyper-parameters are the same as those used to train the original model. An SGD optimizer with Nesterov momentum of 0.9 for is used without the use of dropout. The models are evaluated after the complete training (no early stopping).

WRN-28-10 is trained for 200 epochs, with a learning rate of 0.1 for first 60 epochs, 0.02 for the next 60 epochs, 0.004 for the following 40 epochs and 0.0008 for the last 40 epochs. Training batch size is set to 128 and weight decay is 5×10-4.

DenseNet-BC-100 is trained using batch size 64 for 300 epochs. The initial learning rate is 0.1, and is decreased by 90% at epoch 150 and 225, respectively. A slightly different weight decay is taken, in this case 10-4. In the experiments, compression rate of DenseNet is to 0.5 and growth rate k=12.

ResNeXt-29 uses the same learning rate schedule as DenseNet-BC-100, base channels and initial channels are set to 64. Weight decay is 5×10-4 and batch size is set to 128.

For all datasets, 2% training samples are split for validation (calibration), in this case, 1000 samples for CIFAR-10/ CIFAR-100 and 2000 samples for TinyImageNet. The images in TinyImageNet are downsampled to 32×32 so that models designed for CIFAR can be used efficiently.

In the experiments, a waiting phase of $\Delta T=1$ epochs is used, with a number of label calibrations that depends on training schedule of the specific architecture. WRN has three learning decay and three times of label calibration are performed. In contrast, DenseNet and ResNeXt have only two learning rate decay. Correspondingly, label calibration is performed twice in these networks.

To evaluate the effectiveness of the proposed techniques, a preliminary experiment was conducted on CIFAR-100 for WRN. The techniques were applied without post-hoc calibration (LSP-identity) and with temperature scaling (LSP-TS) and compared with a cross-entropy (CE) one-hot coding baseline. Performance is assessed in terms of top-1 accuracy (Acc@1), ECE and NLL.

It is found that LSP-identity outperforms baseline in terms of ECE and NLL by a large margin. As an extra benefit of soft labels, LSP-identity is also more accurate than the baseline. Due to the advantageous negative feedback of applying post-hoc calibration, LSP-TS was found to works better than LSP-identity on all metrics. For this reason, LSP-TS was used as the standard LSP setup in the following experiments and is also referred to as LSP. In further experiments, it was found that LSP outperforms not only the Cross Entropy baseline, but also Entropy Penalty, Label Smoothing and Focal Loss calibrations. It was found that LSP gains an extra accuracy boost from soft labels for WRN and ResNeXt. The accuracy of LSP is competitive throughout the experiments, and in cases where other methods provide slightly higher accuracy, LSP provides much better NLL, indicating that LSP suffers much less than other methods from miscalibration.

The provided training methods can be configured according to at least two hyper-parameters: number of epochs LT of the waiting phase, and frequency of label calibration. Experiments were conducted to exhaustively search for the best hyper-parameters on CIFAR-100 for WRN-28-10.

Waiting phase: There are three learning rate decay in the training schedule of WRN-28-10. In this experiment, the calibration frequency is fixed to three and label calibration is performed LT epochs after each learning rate decay. A search is performed for the best $\Delta T \in \{-20,-10,-1,0,+1,+10,+20\}$. This search shows that $\Delta T=1$ works the best for both generalization and calibration.

Frequency: Another experiment was performed to determine the result of different frequencies. In experiments of frequency $\in \{1,2,3\}$, $\Delta T=1$ is fixed, and the impact of label calibration in different learning stages is investigated. The results show that it is greatly beneficial to perform label calibration at least once per learning rate decay. For WRN-28-10, frequency=3 has the best performance in general, and it is expected that this is a good setting in general. For experiments of frequency $\in \{4,6,199\}$, it is investigated whether additional label calibration before the first learning rate decay (frequency=4), in the middle of each learning stage (frequency=6) or after each epoch (frequency=199) is beneficial. It was found that performing an additional label calibration before the first learning rate decay provides an improvement in ECE at the expense of about 1% lower accuracy and worse NLL. No improvements were found for frequency=6 and frequency=200 on this dataset. It is thus preferably to perform a label calibration at most once learning rate decay.

The experiments indicate that overall it is most beneficial to perform a label calibration one epoch after each learning rate decay.

In a further experiment, training with temperature smoothing was compared to training with a latent Gaussian process as post-hoc calibrator. In these experiments, LSP-GP improves NLL but degrades ECE slightly. This may be due to the high complexity of GP demanding more calibration samples. In general, the GP post-hoc calibrator works well in combination with the proposed training techniques, showing that they are well compatible with other calibration methods.

Several choices for post-hoc calibration were compared: none, temperature smoothing, latent Gaussian Processes, and I-MAX. Experiments were performed for WRN-28-10 on TinyImageNet, and for WRN-28-10, DenseNet-BC-100 and ResNeXt-29 on CIFAR-100. It was found that just using post-hoc calibration without the proposed on-the-fly calibration techniques fails to improve or even deteriorates accuracy of the image classifier. On the other hand, combining the proposed on-the-fly calibration with post-hoc calibration was found to result in a better generalization. It was also found that most post-hoc calibration methods mitigate miscalibration in terms of NLL and ECE. When the image classifier is regularized a-priori using the provided techniques, miscalibration is further reduced. In the case of I-MAX, it was found that the provided techniques do not improve calibration in terms of ECE. This is because I-MAX, as a binning method, is particularly compatible with the binning scheme of ECE calculation and provides the best ECE performance among all post-hoc methods. Adding on-the-fly calibration as proposed herein may in such cases slightly degenerate performance in terms of ECE. Still, the combination of the provided techniques with I-MAX is beneficial since it avoids the impaired accuracy of the image classifier caused by I-MAX.

Another experiment involves the comparison of the proposed techniques to self-distillation. Self-distillation uses soft labels from one model to improve performance of another model. This is in contrast to the provided techniques, that use soft labels of the model being trained itself. Interestingly, the provided techniques are found to work better then self-distillation. In particular, an experiment was performed to compare the provided techniques to a technique called Teacher-free Knowledge Distillation (TfKD-self). The comparison is carried out on CIFAR-10/100 in terms of Acc@1, NLL and ECE. Parameters $\tau=20$ and $\alpha=0.95$ were used. Other hyper-parameters are as for the other experiments.

It was found that the provided techniques provide far better NLL and ECE across setups, suggesting a large improvement in preventing miscalibration. This is at the expense of having a lower accuracy on most of the dataset-model pairs. This corresponds to the fact that TfKD-self is designed for generalization, not for preventing miscalibration.

Several reasons why TfKD-self is worsely calibrated than the provided techniques were identified. First, in TfKD-self, cross-entropy loss with hard labels is applied to all samples. When updating the label vectors, the provided techniques only use hard labels for incorrectly classified samples. Though the coefficient $1-\alpha$ ahead of cross-entropy in TfKD-self is usually small, using one-hot coding label without selection still increases risk of overconfidence. If $\alpha$ is set to one to circumvent overconfidence, heavily regularized teacher models, whose training accuracy is not 100%, could provide misleading soft labels to degenerate performance of student models. The sample selection mechanism described herein does not have to face such a trade-off.

Further, teacher models in TfKD-self are pre-trained models. Predictions of pre-trained models trained by hard labels are relatively close to hard labels and are commonly overconfident. Since TfKD-self enforces consistency between teachers' output and students' output, overconfidence of student models could be anticipated. On the contrary, in different learning phases of training the model, the provided techniques may use calibrated predictions as soft labels, which is equivalent to mimic well-calibrated models.

Moreover, in TfKD-self, temperature scaling is applied to logits from teacher models and student models at the same time for perfect imitation, while the provided techniques only optionally apply post-hoc calibration (e.g. temperature scaling) to logits from teacher models (previous predictions). This enables output of student models to deviate from output of teacher models, introducing extra calibration flexibility for training.

Figure 7:
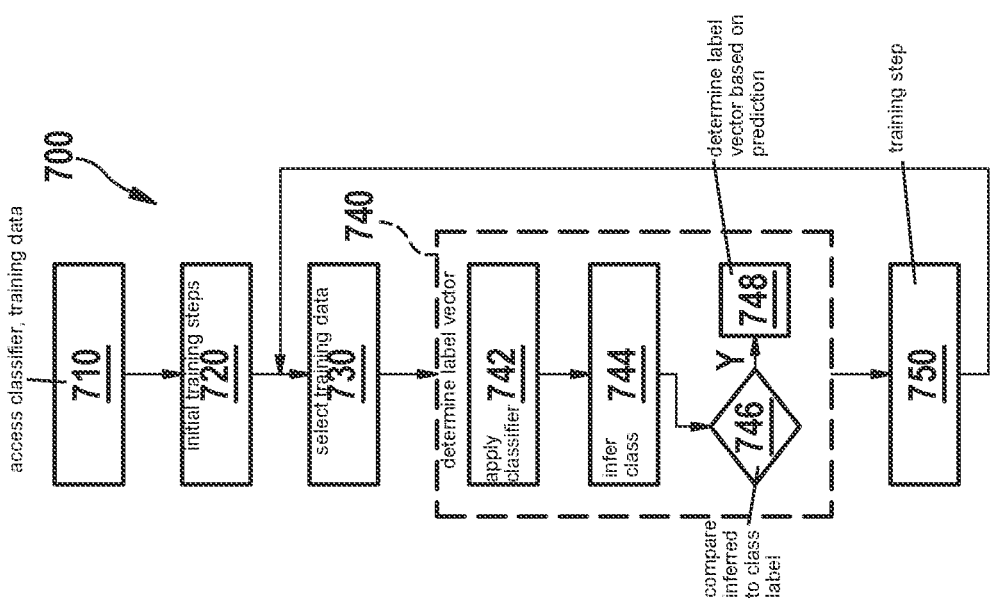
FIG. 7 shows a computer-implemented method of training a classifier, according to an example embodiment of the present invention.

FIG. 7 shows a block-diagram of computer-implemented method 700 of training a classifier, for example an image classifier. The classifier may be configured to determine a prediction vector for an input instance, e.g., an input image. The prediction vector may comprise class probabilities for multiple respective classes. The method 700 may correspond to an operation of the system 100 of FIG. 1. However, this is not a limitation, in that the method 700 may also be performed using another system, apparatus or device.

The method 700 may comprise, in an operation titled "ACCESS CLASSIFIER, TRAINING DATA", accessing 710 trainable parameters of the classifier and a training dataset comprising multiple training instances and corresponding class labels.

The method 700 may comprise training the classifier. The training may comprise, in an operation titled "INITIAL TRAINING STEPS", performing 720 one or more initial training steps of training the classifier to obtain current parameter values for the trainable parameters. The training may comprise, in an operation titled "SELECT TRAINING DATA", selecting 730 a training instance, e.g., a training image, and a corresponding class label from the training dataset.

The training may comprise, in an operation titled "DETERMINE LABEL VECTOR", determining 740 a current label vector for training the classifier on the training instance. The determining 740 may comprise, in an operation titled "APPLY CLASSIFIER", applying 742 the classifier to the training instance according to the current parameter values to obtain a prediction vector. The determining 740 may comprise, in an operation titled "INFER CLASS", inferring 744 a predicted class of the multiple classes from the prediction vector. The determining 740 may comprise, in an operation titled "COMPARE INFERRED TO CLASS LABEL", comparing 746 the predicted class to the class label. The determining 742 may comprise, in an operation titled "DETERMINE LABEL VECTOR BASED ON PREDICTION", if the predicted class is equal to the class label, determining 748 the current label vector as a soft label based on the prediction vector.

The training may comprise, in an operation titled "TRAINING STEP", performing 750 a current training step of training the classifier on the training instance using the current label vector.

Figure 8:
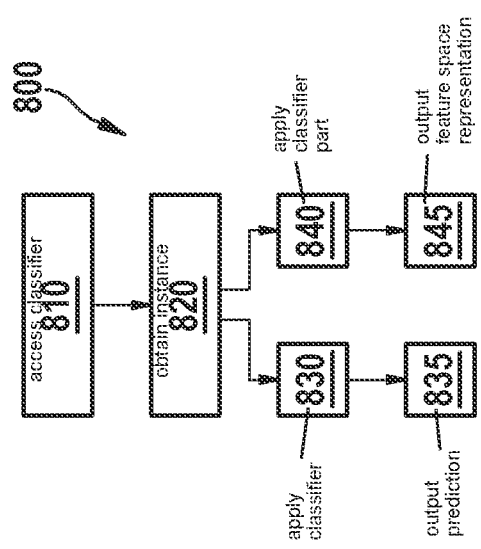
FIG. 8 shows a computer-implemented method of using a classifier, according to an example embodiment of the present invention.

FIG. 8 shows a block-diagram of computer-implemented method 800 of using a trained classifier, for example an image classifier. The method 800 may correspond to an operation of the system 200 of FIG. 2. However, this is not a limitation, in that the method 800 may also be performed using another system, apparatus or device.

The method 800 may comprise, in an operation titled "ACCESS CLASSIFIER", accessing 810 trained parameters of the classifier. The classifier may have been previously trained according a method described herein, e.g., method 700 of FIG. 7.

The method 800 may comprise, in an operation titled "OBTAIN INSTANCE", obtaining 820 an input instance, e.g., an input image.

The method 800 may comprise, in an operation titled "APPLY CLASSIFIER", applying 830 the classifier to the input instance to determine a prediction vector for the input instance. The method 800 may further comprise, in an operation titled "OUTPUT PREDICTION", outputting 835 a prediction based on the prediction vector.

Instead of or in addition to the applying 830 and the outputting 835, the method 800 may comprise, in an operation titled "APPLY CLASSIFIER PART", applying 840 a part of the classifier to the input instance to obtain a feature space representation of the input instance. The method 800 may further comprise, in an operation titled "OUTPUT FEATURE SPACE REPRESENTATION, outputting 845 the feature space representation.

It will be appreciated that, in general, the operations of method 700 of FIG. 7 and method 800 of FIG. 8 may be performed in any suitable order, e.g., consecutively, simultaneously, or a combination thereof, subject to, where applicable, a particular order being necessitated, e.g., by input/output relations. Some or all of the methods may also be combined, e.g., method 800 of using a trained classifier may be applied subsequently to this classifier being trained according to method 700.

The method(s) may be implemented on a computer as a computer implemented method, as dedicated hardware, or as a combination of both. As also illustrated in FIG. 11, instructions for the computer, e.g., executable code, may be stored on a computer readable medium 1100, e.g., in the form of a series 1110 of machine-readable physical marks and/or as a series of elements having different electrical, e.g., magnetic, or optical properties or values. The medium 1100 may be transitory or non-transitory. Examples of computer readable mediums include memory devices, optical storage devices, integrated circuits, servers, online software, etc. FIG. 11 shows an optical disc 1100. Alternatively, the computer readable medium 1100 may comprise data 1110 representing trained parameters of a classifier trained as described herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In connection with a device enumerating several means, several of these means may be embodied by one and the same item of hardware. The mere fact that certain measures are described separately does not indicate that a combination of these measures cannot be used to advantage.

What is claimed is:

1. A computer-implemented method for an image classifier that is configured to determine a prediction vector for an input image, the prediction vector including class probabilities for multiple respective classes, the method comprising training the image classifier, the training including the following steps:

accessing trainable parameters of the image classifier and a training dataset including multiple training images and corresponding class labels;

performing one or more initial training steps of training the image classifier to obtain current parameter values for the trainable parameters;

selecting a training image and a corresponding class label from the training dataset;
determining a current label vector for training the image classifier on the training image by:
applying the image classifier to the training image according to the current parameter values to obtain a prediction vector;
inferring a predicted class of the multiple classes from the prediction vector;
comparing the predicted class to the class label; and
when the predicted class is equal to the class label, determining the current label vector as a soft label based on the prediction vector;
performing a current training step of training the image classifier on the training image using the current label vector, and the method further comprising:
when the predicted class is not equal to the class label, determining the current label vector based on the class label independently of the prediction vector.

2. The method of claim 1, further comprising the following steps:
performing one or more previous training steps of the image classifier according to a previous learning rate and according to previous label vectors;
decaying the previous learning rate;
performing one or more further training steps of training the image classifier according to the decayed learning rate and the previous label vectors to obtain updated parameter values for the trainable parameters;
determining the current label vector for the training image by applying the image classifier according to the updated parameter values; and
performing the current training step according to the current label vector and the decayed learning rate.

3. The method of claim 2, wherein the one or more further training steps form one training epoch.

4. The method of claim 1, further comprising performing the one or more initial training steps using label vectors determined independently of the image classifier.

5. The method of claim 1, wherein the image classifier is a semantic segmentation model configured to compute class probabilities of the multiple classes for respective portions of the input image, and wherein the method further comprises determining and using current label vectors for the respective portions of the input image.

6. The method of claim 1, wherein the input image is represented by pixel values or voxel values or a point cloud.

7. The method of claim 1, wherein the determining of the current label vector based on the prediction vector includes applying a post-hoc calibration model to the prediction vector.

8. The method of claim 7, further comprising training the post-hoc calibration model for the image classifier.

9. A system for an image classifier, the image classifier being configured to determine a prediction vector for an input image, the prediction vector including class probabilities for multiple respective classes, the system comprising:
a data interface for accessing a training dataset including multiple training images and corresponding class labels, and for accessing trainable parameters of the image classifier; and
a processor system that includes one or more processors, wherein the processor system is configured to train the image classifier by:
performing one or more initial training steps of training the image classifier to obtain current parameter values for the trainable parameters;
selecting a training image and a corresponding class label from the training dataset;
determining a current label vector for training the image classifier on the training image by:
applying the image classifier to the training image according to the current parameter values to obtain a prediction vector;
inferring a predicted class of the multiple classes from the prediction vector;
comparing the predicted class to the class label; and
if the predicted class is equal to the class label, determining the current label vector as a soft label based on the prediction vector;
performing a current training step of training the image classifier on the training image using the current label vector, and wherein the processor system is further configured to:
if the predicted class is not equal to the class label, determining the current label vector based on the class label independently of the prediction vector.

10. A non-transitory computer-readable medium on which is stored a computer program for an image classifier, the image classifier being configured to determine a prediction vector for an input image, the prediction vector including class probabilities for multiple respective classes, the computer program, when executed by a processor system, causing the processor system to perform the following steps for training the image classifier:
accessing trainable parameters of the image classifier and a training dataset including multiple training images and corresponding class labels;
performing one or more initial training steps of training the image classifier to obtain current parameter values for the trainable parameters;
selecting a training image and a corresponding class label from the training dataset;
determining a current label vector for training the image classifier on the training image by:
applying the image classifier to the training image according to the current parameter values to obtain a prediction vector;
inferring a predicted class of the multiple classes from the prediction vector;
comparing the predicted class to the class label; and
when the predicted class is equal to the class label, determining the current label vector as a soft label based on the prediction vector;
performing a current training step of training the image classifier on the training image using the current label vector, and wherein the processor system further performs:
when the predicted class is not equal to the class label, determining the current label vector based on the class label independently of the prediction vector.

11. The method of claim 1, further comprising, subsequent to the training, using the trained image classifier, the using including the following:
accessing trained parameters of the image classifier;
obtaining an input image;
applying the image classifier, using the accessed trained parameters, to the obtained input image to determine a prediction vector for the input image; and
outputting a prediction based on the prediction vector.

12. The method of claim 11, further comprising determining an out-of-distribution score for the input image from the prediction vector.

13. The method of claim 1, further comprising, subsequent to the training, using the trained image classifier, the using including the following:
   accessing trained parameters of the image classifier;
   obtaining an input image;
   applying a part of the image classifier, using the accessed trained parameters, to the obtained input image to obtain a feature space representation of the input image; and
   outputting the feature space representation.

14. A computer-implemented method for an image classifier that is configured to determine a prediction vector for an input image, the prediction vector including class probabilities for multiple respective classes, the method comprising training the image classifier, the training including the following steps:
   accessing trainable parameters of the image classifier and a training dataset including multiple training images and corresponding class labels;
   performing one or more initial training steps of training the image classifier to obtain current parameter values for the trainable parameters;
   selecting a training image and a corresponding class label from the training dataset;
   determining a current label vector for training the image classifier on the training image by:
      applying the image classifier to the training image according to the current parameter values to obtain a prediction vector;
      inferring a predicted class of the multiple classes from the prediction vector;
      comparing the predicted class to the class label; and
      when the predicted class is equal to the class label, determining the current label vector as a soft label based on the prediction vector; and
   performing a current training step of training the image classifier on the training image using the current label vector, and the method further comprising, subsequent to the training, using the trained image classifier, the using including the following:
   accessing trained parameters of the image classifier;
   obtaining an input image that represents a computer-controlled system and/or its environment;
   applying a part of the image classifier to the obtained input image to obtain a feature space representation of the input image; and
   applying a further trained model to the feature space representation to infer control data for controlling the computer-controlled system.

15. The system of claim 9, the system further comprising:
   a storage in which trained parameters of the image classifier are stored, wherein the processor system is further configured to obtain an input image and apply the image classifier, using the stored trained parameters, to the input image to determine a prediction vector for the input image and output a prediction based on the prediction vector.

16. The system of claim 9, the system further comprising:
   a storage in which trained parameters of the image classifier are stored, wherein the processor system is further configured to apply a part of the image classifier, using the stored trained parameters, to the input image to obtain a feature space representation of the input image and output the feature space representation.

* * * * *